United States Patent [19]
Kim et al.

[11] Patent Number: 5,972,477
[45] Date of Patent: Oct. 26, 1999

[54] LAMINATED FIBER NETWORKS

[75] Inventors: Dai W. Kim, Chatham, N.J.; Gerald Peter Rumierz, Tega Cay, S.C.; Clinton Dale Felton, Charlotte, N.C.

[73] Assignee: Hoechst Celanese Corporation, Warren, N.J.

[21] Appl. No.: 08/881,028

[22] Filed: Jun. 23, 1997

[51] Int. Cl.⁶ ........................................................ B32B 1/00
[52] U.S. Cl. ............................ 428/175; 428/178; 428/401; 422/182; 422/189; 422/308; 264/257
[58] Field of Search .................................... 428/166, 172, 428/178, 212; 442/121, 182, 189, 197, 304, 308; 264/257, 258, 177

[56] References Cited

U.S. PATENT DOCUMENTS

| | | |
|---|---|---|
| Re. 31,345 | 8/1983 | Schwartzkopff et al. . |
| 4,128,684 | 12/1978 | Bomio et al. . |
| 4,212,692 | 7/1980 | Rasen et al. ............................ 156/167 |
| 4,252,590 | 2/1981 | Rasen et al. . |
| 4,472,472 | 9/1984 | Schultz . |
| 4,584,228 | 4/1986 | Droste . |
| 4,631,221 | 12/1986 | Disselbeck et al. . |
| 4,690,847 | 9/1987 | Lassiter .................................... 428/71 |
| 4,890,877 | 1/1990 | Ashtiani-Zarandi et al. . |
| 5,158,821 | 10/1992 | Gebauer et al. . |
| 5,364,686 | 11/1994 | Disselbeck et al. . |
| 5,731,062 | 3/1998 | Kim et al. . |

FOREIGN PATENT DOCUMENTS

| | | |
|---|---|---|
| 0 324 714 A2 | 7/1989 | European Pat. Off. . |
| WO 97/23179 | 7/1997 | WIPO . |

*Primary Examiner*—Donald Loney
*Attorney, Agent, or Firm*—Alston & Bird LLP

[57] ABSTRACT

Laminated fiber network structures having high resilience, good cushioning properties, and excellent impact-resistance include at least one layer of a three-dimensional fiber network material and a second layer, which may be a planar material (e.g. a fabric, film, or sheet) or a second layer of a three-dimensional fiber network material. The surfaces of the two layers face each other and are bonded together at their points of contact. The three-dimensional fiber network material is a fabric made from thermoplastic filaments that are at least 0.1 mm in diameter, where the fabric has an array of projections and optional depressions pushed out of one or both sides of the fabric.

25 Claims, 2 Drawing Sheets

LAMINATED FIBER NETWORKS

FIELD OF THE INVENTION

This invention relates to laminated structures containing three-dimensional networks of thermoplastic fibers.

BACKGROUND OF THE INVENTION

Three-dimensional fiber networks are known. These are generally derived from textile fabrics that have been impregnated with a thermoset polymer or a low melting thermoplastic and then molded so that the fabric has an array of projections rising from the plane of the fabric. For example, U.S. Pat. No. 4,631,221 describes a laminate containing a rigid three-dimensional fiber network having regularly arranged projections. The three-dimensional network is placed between two sheets of rigid material. The three-dimensional network used in the laminate is made by the deep-drawing of a sheet-like textile fabric to make projections. The textile fabric is impregnated with a thermoset resin and dried to yield a pre-preg prior to deep drawing, and is cured after deep-drawing. The textile fabric is made from a multifilament yarn so that a larger amount of resin can be absorbed into the interfilament regions.

U.S. Pat. No. 5,364,686 describes a three-dimensional shaped material which is made from a fabric comprising a yarn that has thermoplastic fibers mixed with higher melting reinforcing fibers; the fabric is shaped by deep drawing at a temperature high enough to melt the lower melting thermoplastic material but not the reinforcing fiber to yield a three-dimensional structure which becomes rigid after it is cooled, possibly due in part to the fixing of fiber crossover points. This also can be laminated so that it has rigid layers on the outside.

U.S. Pat. No. 4,890,877 describes an energy absorbing structure for use in automobile doors, wherein the energy absorbing structure is a highly stretchable lightweight material that has been coated with a resin (e.g. a thermoset) and then molded so that it has a series of projections, which are preferably truncated cones. The structure after molding does not appear to have an open fiber network appearance. U.S. Pat. No. 5,158,821 describes a fabric that can be easily deep drawn and then impregnated with a resin to make materials like those described above.

Thermoplastic three-dimensional fiber networks which are similar in appearance to those described above but which are much more resilient are described in commonly assigned copending U.S. application No. 08/577,65 now U.S. Pat. No. 5,791,062 to kim et al. These fiber networks are made from large diameter thermoplastic fibers, usually monofils, and have projections in which the fibers are not bonded to one another at the points where the fibers intersect one another. These fiber networks were not used in laminated products.

U.S. Pat. Nos. 4,584,228; 4,252,590; and Re 31,345 all describe non-woven matting materials that have undulating patterns of projections both above and below the plane of the fabric. These have impact absorbing properties. Finally, U.S. Pat. No. 4,472,472 describes protective devices in which impact is absorbed by bowed plastic members, which flex on impact but then recover afterwards to absorb future shocks.

The fiber network structures described above and elsewhere that are in sandwich structures generally are rigid and are intended for use mainly as lightweight structural materials. Sandwich structures that are resilient and can perform as cushioning or impact-absorbing materials are generally not known and have apparently not been described or even suggested. Such materials may be useful in a variety of applications.

SUMMARY OF THE INVENTION

Laminated fiber networks have been found that have excellent cushioning properties and that can be used as impact absorbers. These laminates are made up of:

(a) A first layer, comprised of a three-dimensional fiber network material. The three-dimensional fiber network material is a woven or knit textile fabric having a multiplicity of compressible projections rising above the base plane of the textile fabric, and optionally a multiplicity of compressible depressions extending below the base plane of the textile fabric. The tops of the projections define a surface. The tops of the optional depressions, if present, define a second surface. Otherwise, the base plane defines the second surface. The tops of the projections and depressions are defined as the highest points of the projections and depressions (i.e. the points farthest from the base plane), and for example may be points, positions on a curve, or the flat tops of truncated projections or depressions. The three-dimensional fiber network material is made from thermoplastic filaments having a diameter in the range of about 0.1 mm to about 1 mm, preferably about 0.1 mm to about 0.6 mm. The filaments in the three-dimensional fiber network material cross over one another at intersections, and the filaments at substantially all of these intersections (greater than 80%, preferably greater than 90%) are not bonded to one another in the material before the three-dimensional fiber network material has been bonded to other materials (i.e. the filaments in greater than 80%, preferably greater than 90% of the cross-over points are not bonded to each other in regions of the material that are not bonded to other materials); and (b) A second layer, which may be a planar material or another layer of a three-dimensional fiber network material. The three-dimensional fiber network material may be the same material as in the first layer, or may be a different material (e.g. different polymer, different size fiber, different size projections, and the like). "Planar material" means a material which is basically flat and thin, such as a film, sheet, or fabric.

In the laminated materials, the layers are basically flat (though not necessarily thin) and are stacked one on top of the other. One surface of the first layer is bonded to one surface of the second layer. The bonds are located at the points at which the surfaces are in contact with each other. Much of the area of the three-dimensional fiber network material is not on the surface and is not in contact with other surfaces. Methods of bonding include adhesive bonding (i.e. using an adhesive), melt bonding, ultrasonic welding, sewing, and weaving.

In one embodiment of the invention, the second layer is another layer of a three-dimensional fiber network material, which may be the same as or different than the first layer. Each layer may be bonded to the other at either of the surfaces of the material (i.e. the surface defined by the tops of the projections or the surface defined by either the tops of the optional depressions or by the base plane, independently for each layer). In a preferred variation of this embodiment, the two three-dimensional fiber network materials are each bonded to the other by bonding of the tops of the projections or optional depressions of one layer to the tops of the projections or optional depressions of the other layer. If the two three-dimensional fiber network material layers have the same dimensions with respect to spacing of the projections, then the tops of the projections and/or depressions can be matched so that all the projections and/or depressions from each layer match up with one another. Bonding is at the points of contact, which is the tops of the projections and/or depressions (e.g. the flat tops of truncated cones in materials having truncated cones).

In another variation of this embodiment, the three-dimensional fiber network materials are made by interdigitation, resulting in an undulating pattern of projections and depressions, without a clearly defined base plane. The projections and depressions are rounded and dome-like in appearance. The layers have the same appearance when they are flipped over. These may also be bonded together, with the tops of the domes of each layer bonded to the tops of the domes of the other layer at their points of contact.

Alternatively, the second layer can be a planar material, and the planar material is then pressed against one of the surfaces of the three-dimensional fiber network material, and the layers are bonded together at the points at which the layers are in contact with each other.

In further embodiments, there may be additional layers beyond the first two layers, so that the laminate comprises at least one layer of three-dimensional fiber network material and two or more other layers, each of which may independently be a layer of a planar material or a layer of a three-dimensional fiber network material. The layers of planar material and the layers of three-dimensional fiber network material may be the same materials or may be different materials. Any number of layers may be stacked and bonded to one another by bonding the points at which the surfaces of adjacent layers are in contact with each other. When several layers are stacked, they will generally be stacked in an alternating arrangement. Layers of three-dimensional fiber network material will alternate with planar layers.

While there may be many layers in the laminates, in many uses there are only three layers in the laminates. These may include two three-dimensional fiber network layers, which may be the same or different, and a planar layer, with the planar layer sandwiched between the two fiber network layers, with each of the two surfaces of the planar layer bonded to one surface of each fiber network layer. Alternatively, the laminate may include two planar layers, which may be the same or different, and a three-dimensional fiber network layer, with the three-dimensional fiber network layer sandwiched between the two planar layers. The two outer surfaces of the three-dimensional fiber network layer are each bonded to a surface of the planar layer.

The laminated fiber networks that are made in accordance with this invention are highly resilient, returning substantially to their original height after being compressed to 50% of their original height.

The invention also is a method of making materials that are impact-resistant and/or have good cushioning properties. The method includes the following steps:

(a) making a monofilament having a diameter in the range of about 0.1 mm to about 1 mm from a thermoplastic polymer;

(b) making the monofilament into a knit, woven, or non-woven textile fabric;

(c) making a series of projections and optional depressions in the textile fabric by a thermo-mechanical process to yield a three-dimensional fiber network material; and (d) bonding a layer of a planar material to one or both surfaces of the three-dimensional fiber network material at the points at which the surfaces are in contact with one another.

To make a sandwich structure, a layer of a planar material is bonded to each surface of the three-dimensional fiber network material, or a layer of a three-dimensional fiber network material is bonded to each surface of the planar material. Optionally pieces of three-dimensional fiber network material may be stacked or nested and then bonded together to form a fiber network structure, which is then bonded to a layer of planar material in step (d) above. Optionally, pieces of planar material can also be stacked and bonded together. Optionally multiple layers of three-dimensional fiber network material and planar material may also be stacked and bonded together in an alternating configuration.

In the method described above, the monofilament is preferably made by a melt-spinning process, though the monfilament may also be made by wet spinning or dry spinning using a solvent. The thermo-mechanical process is carried out by the application of a mechanical force at a temperature above the glass transition temperature of the thermoplastic polymer, but below its melting temperature. Preferably the thermoplastic polymer is poly(ethylene terephthalate).

DETAILED DESCRIPTION OF THE INVENTION

Figure 1:
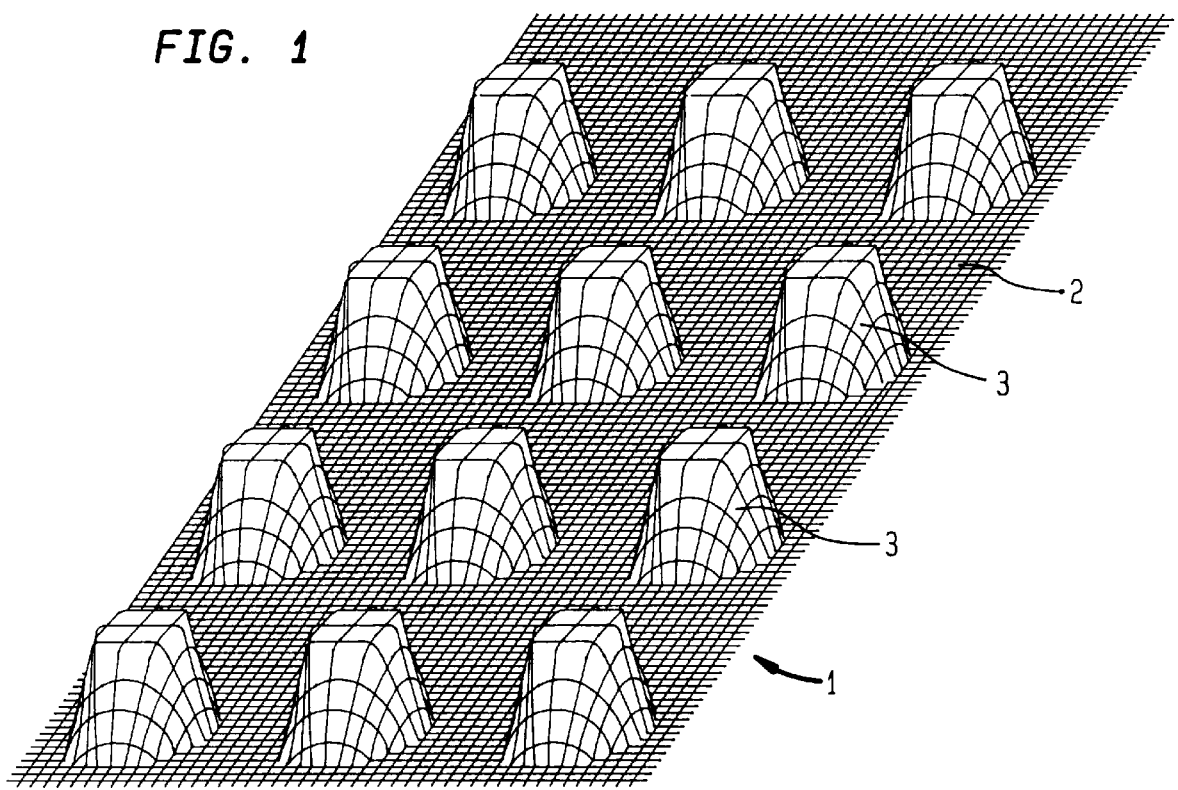
FIG. 1 shows schematically a section of a three-dimensional fiber network material 1 having a multiplicity of projections 3 on base plane 2. The open mesh structure of the fiber network is illustrated. These illustrative projections have a square base and square top, with the sides of the tops of the projections having smaller dimensions than the sides of the bases of the projections.
Figure 2:
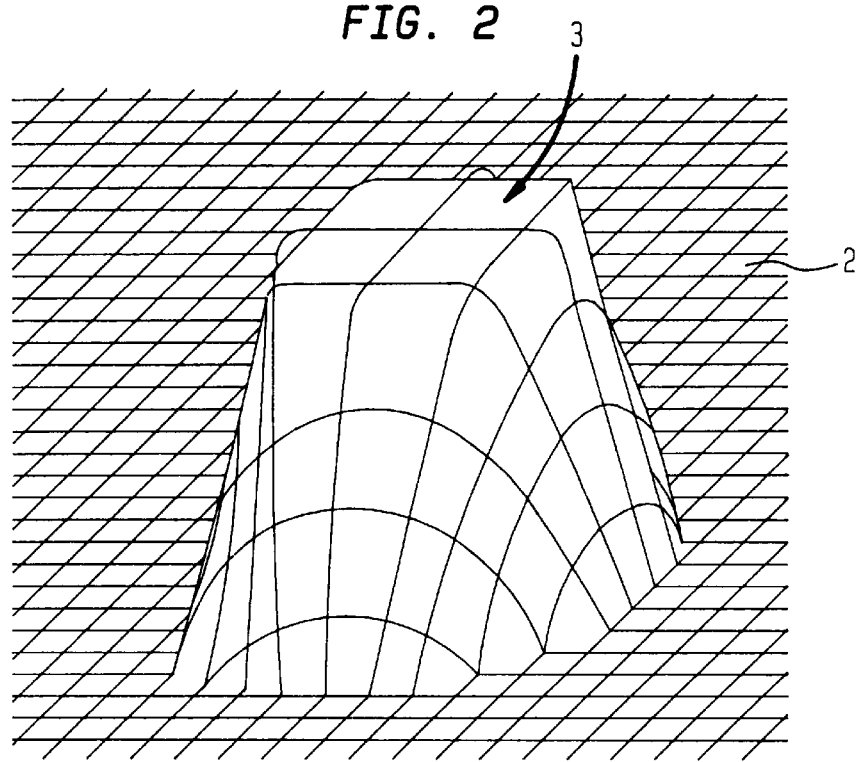
FIG. 2 schematically depicts an enlargement of one of the projections 3 of FIG. 1, showing the widening of the mesh structure of the textile materials which occurs in the area that is deformed.

The laminated fiber networks have at least two layers laminated together, a first layer comprised of a three-dimensional fiber network material and a second layer comprised of either a three-dimensional fiber network material or a layer of planar material. The two layers each have two surfaces, and the two layers are placed so that two surfaces, one from each layer, are placed against each other, and the points where the two layers are in contact are bonded together by any of the many methods that are generally used for binding materials together. These include bonding with an adhesive, melt bonding, ultrasonic welding, sewing and weaving.

In its simplest embodiments, this invention comprises a layer of a three-dimensional fiber network material bonded to either another layer of a three-dimensional fiber network material, which may be the same or different, or to a layer of a planar material. Other layers may be added, so that the three-dimensional fiber network material is always adjacent to or sandwiched between layers of planar material, of three-dimensional fiber network material, or of both, and the layers of planar material are always adjacent to or sandwiched between layers of three-dimensional fiber network material, of other layers of planar material, or of both. Generally, the layers of three-dimensional fiber network material alternate with layers of planar material.

The three-dimensional fiber network material is generally a woven or knit textile fabric that has a multiplicity of projections and optional depressions on the base plane of the fabric. Non-woven materials may also be used but are less preferred. Projections and depressions are portions of the fabric that have been pushed out of the base plane of the fabric. Projections rise above the base plane of the fabric, and depressions extend below the base plane of the fabric (i.e. on the other side of the fabric from the projections).

The projections and optional depressions have retained an open net-like appearance, comprising discrete filaments that are substantially not bonded at the intersections where the filaments cross one another (i.e. greater than 80%, preferably greater than 90%, of the intersections of filaments have no bonding between the filaments). The bonding of filaments at the intersections is the bonding that exists after the projections and optional depressions have been compressed a few times (i.e. about five times), since sometimes the process used to make the materials can result in bonding that is weak and breaks easily when the projections and depressions are compressed. This level of bonding is descriptive of the material before it is bonded to other materials. Once the three-dimensional fiber network material is bonded to another layer, the portions of the material not involved in bonding to other materials will still be mostly non-bonded at the cross-over points.

The textile fabric is made from thermoplastic filaments having a diameter in the range of about 0.1 mm to about 1 mm (0.1 mm corresponds to about 100 dpf fiber in the case of poly(ethylene terephthalate) monofilament). These filaments are generally in the form of a monofilament (also referred to as "monofil") and are knit or woven to yield a fabric. The filaments may also be in the form of a bicomponent fiber, such as a sheath/core polymer, which is particularly useful in making non-woven materials, by using a lower-melting sheath polymer to hold the filaments together. The thermoplastic filaments may also be made by using a thermoplastic multifilament yarn to make the fabric and then consolidating the small filaments in the fabric under heat and pressure to yield larger filaments having a diameter of at least about 0.1 mm in the same process that is used to make the projections and optional depressions. This is a less useful method because consolidation of small fibers to yield larger filaments by melting also results in at least some bonding of the filaments where the filaments cross over one another. If the filaments bond at the intersections, the fiber network lose its resilience. Thus, as stated above, the preferred fabrics and fiber networks are made from monofilament fibers, which are generally made from one polymer or a blend of polymers, but may also be bicomponent fibers.

The three-dimensional fiber network structures are resilient. "Resilient" in this case means that the projections and optional depressions substantially recover their shape and height after being compressed to 50% of their height. There may be minor changes in the shapes of the projections and optional depressions, as for example a change in the curvature of the edges at the tops of the projections after the projections and depressions are compressed. This resilience is apparently due to the fact that the filaments in the projections and depressions are not bonded to one another where they cross over each other. As the density of permanent bonds (bonds that do not break under compression) at the points at which the fibers cross over one another at intersections increases, the fiber network structure and the projections become more rigid, and the projections lose their resilience.

Because of the open structure of the textile fabric and the large void volume within the projections and/or depressions, the network has a low density compared with the polymer (generally less than about 10%, preferably less than about 5%) based on the amount of space occupied by the network. The laminates have a slightly higher density. Air and other fluids can flow through the fiber network structure with little resistance.

The fibers in the three-dimensional fiber network are generally made of a single thermoplastic polymer or copolymer that generally melts at a temperature in the range of about 80° C. to about 375° C., preferably about 150° C. to about 350° C. Optionally, a blend or polymer alloy may be used. The fiber is not derived from a hybrid yarn, which is a non-melting reinforcing fiber and thermoplastic fiber melted together. The polymer is preferably made into fiber by a melt spinning process, though other processes, such as wet spinning and dry spinning from a solvent, can also be used. As stated above, the preferred fiber is a monofil, though a bicomponent fiber may also be desirable. Preferred classes of polymers include polyesters, polyamides, thermoplastic copolyetherester elastomers, poly(arylene sulfides), polyolefins, aliphatic-aromatic polyamides, polyacrylates, and thermotropic liquid crystalline polymers.

The three-dimensional fiber network structure is generally made by deforming a textile fabric into the desired shape at a temperature high enough that the fibers can be permanently deformed, as would occur, for example, in a fiber drawing process. The temperature will generally be above the glass transition temperature (Tg), and preferably will also be below the melting temperature. The deformation is brought about using a thermomechanical process, which means the application of a mechanical force at an elevated temperature. The mechanical force can be applied using numerous methods, such as solid phase pressure forming, vacuum bladder match plate molding, interdigitation, deep drawing, use of a heated mold, and the like. Heat and pressure are applied for a sufficient time that the textile fabric is permanently deformed, but not for such a long time or at such a high temperature (e.g. well above the melting temperature) that the filaments bond to each other in an irreversible manner or coalesce, causing the shaped fiber network to lose its open net-like structure or resilience. The individual filaments in the three-dimensional fiber network structure still have retained much of their individual fiber-like appearance and properties and have not bonded to one another.

The starting two-dimensional textile fabric that is utilized in making the three-dimensional fiber network structure is selected from any of the standard classes of fabrics, such as knit, woven, or non-woven textile fabrics. The type of fabric depends on the kind of resulting network structure that is desired. Knit fabrics have the advantage that their structure is readily deformed without excessive elongation of individual fibers, which leads to breakage of the fibers. They are also drapable. Woven fabrics have the advantage that they are more readily produced from larger diameter fibers, such as monofils. Non-woven fabrics are more difficult to shape into a three-dimensional fiber network structure and are therefore less preferred.

The projections and optional depressions that are made on the plane of the textile fabric can be in the shape of cones or truncated cones, pyramids or truncated pyramids having polygonal or other shaped bases, cylinders, prisms, spherical elements, and the like. Generally, the tops of the projections (which may be points, such as the apex of a pyramid, the high points of curves, such as dome-shaped projections, flat surfaces at the peaks of truncated projections, and the like) define a plane approximately parallel to the base plane. Similarly, if there are also depressions, their tops define a second surface, such as a plane approximately parallel to the base plane. As a result, the preferred three-dimensional networks define two surfaces or planes, one being defined by the tops of the projections and the other being defined by either the base plane or the tops of the depressions. Furthermore, the projections and optional depressions are generally arranged in a uniform or repetitive pattern or array with a uniform spacing. The shapes, heights, sizes and spacing of the projections and optional depressions can be modified to suit a specific application. For example, the height may vary so that the surfaces defined by the tops of the projections have some curvature, though flat surfaces are preferred. They may also vary in rigidity to increase or decrease their weight-bearing capacity. The projections and/or depressions can also be elongated in width, but they still have finite dimensions in all directions, so that they do not appear as corrugations, which would result if projections covered the entire width of the fabric, for example. Preferred shapes of the tops of the truncated projections and/or depressions include circles, squares, and regular polygons with more than four sides. Rectangles are less preferred and would occur with projections that are elongated in width. Note also that when both projections and depressions are present, they may have been formed by an interdigitation process, in which case there is little or no apparent base plane, since the low point between two projections may be the peak of a depression on the other side of the fabric rather than the base plane. Interdigitated materials generally look the same when they are flipped over, so that there is no distinction between the top and bottom of the materials, or between projections and depressions.

Figure 3:
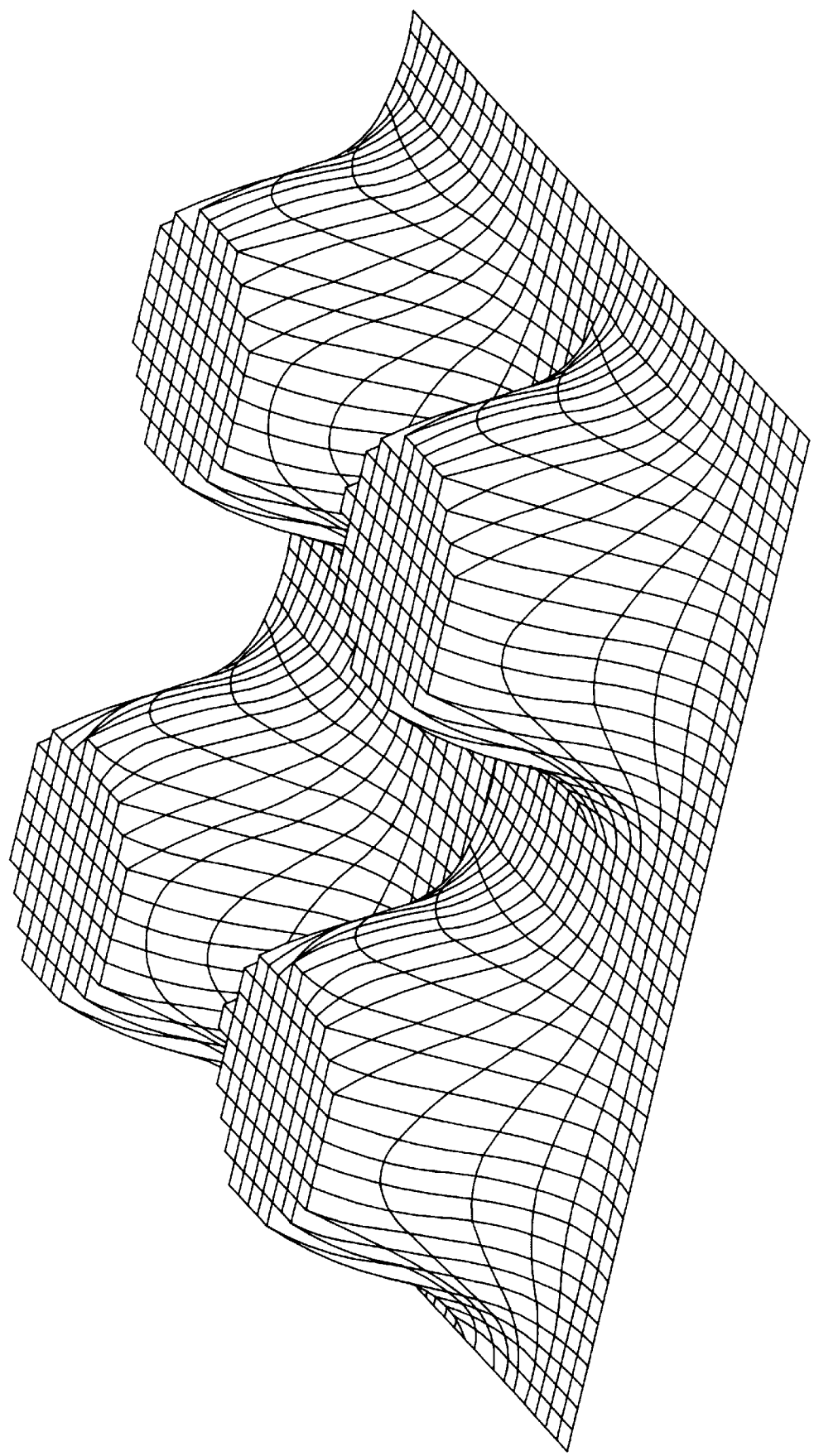
FIG. 3 schematically depicts an enlargement of four projections that are in the shape of truncated cones.

The sizes, heights, shapes and spacing of the pattern of projections and depressions affect the cushioning properties and "feel" of the three-dimensional networks and of the laminates. The rigidity of the individual fibers in the network structure also is a major factor in determining the cushioning properties of the three-dimensional networks, and the rigidity of the fibers in turn depends on the diameter of the filaments and the kind of materials (e.g. polymers) from which the filaments are made. For most applications, filament diameters are in the range of about 0.1 mm to about 1.0 mm, preferably about 0.1 mm to about 0.6 mm. An example of a preferred structure of regularly spaced projections having a square base and a square top that has shorter sides than the sides of the square base is shown in FIG. 1. An even more preferred structure consists of a regular array of projections which are truncated cones of similar size and shape, as shown in FIG. 3, for example.

As stated previously, it is preferred that the fibers are made from a single polymer or copolymer. Other additives may be present, including light stabilizers, ultraviolet stabilizers, flame retardants, spinning lubricants, plasticizers, and biocides. Thermoplastic polymers that may be used include: (1) polyesters of alkylene gylcols having 2–10 carbon atoms and aromatic diacids. Poly(alkylene terephthalates), especially poly(ethylene terephthalate) and poly(butylene terephthalate), are particularly preferred. Also preferred are poly(alkylene naphthalates), which are polyesters of 2,6-napthalenedicarboxylic acid and alkylene glycols, as for example poly(ethylene naphthalate); (2) thermoplastic copolyetherester elastomers, such as RITE-FLEX® thermoplastic copolyetherester elastomer, a copolymer of 1,4-butanediol polyether glycols, 1,4-butanediol, and terephthalic acid, manufactured by Hoechst Celanese Corporation, Somerville, New Jersey; (3) polyamides, especially nylon 6 and nylon 66, which are commonly used in making fibers; (4) poly(arylene sulfides), especially poly (phenylene sulfide); (5) polyolefins, particularly polyethylene and polypropylene; (6) aliphatic aromatic polyamides, such as polyamides derived from terephthalic acid and 2-methyl-1,5-pentanediamine; (7) polyesters derived from 1,4-cyclohexanedimethanol and terephthalic acid; and (8) thermotropic liquid crystalline polymers, such as for example polyesters derived from 6-hydroxy-2-naphthoic acid and 4-hydroxybenzoic acid.

Specific preferred polymers include poly(ethylene terephthalate) (PET), nylon 6, nylon 66, polyethylene, and polypropylene. The most preferred polymer is PET. PET is widely available from many manufacturers, including Hoechst Celanese Corporation, Somerville, New Jersey. The PET should be of high enough molecular weight to be suitable for spinning into fibers; generally a molecular weight corresponding to an intrinsic viscosity (I.V.) of at least about 0.6 dl/gm is suitable, where the I.V. is determined by measuring the relative viscosity of a 4% solution (weight/volume) in o-chlorophenol at 25° C. The relative viscosity is then converted using standard conversion factors to intrinsic viscosity. Polypropylene, polyethylene and nylons are also widely available from many manufacturers.

The spacing, size, height, and shape of the projections and optional depressions, the diameter of the filaments, and fabric construction are chosen to give the desired cushioning properties for the specific application. Preferred heights of the projections and optional depressions are in the range of about 2 mm to about 25 mm. Preferred average diameters of the projections and optional depressions that have a round cross-section are in the range of about 3 mm to about 25 mm.

The shapes of the deformations depend on the process used to make them. For example, in a deformation process in which the textile fabric is held against a heated plate with round holes and a cylindrical rod is pushed through the hole on the same side as the textile fabric, so that the textile fabric is pushed through the hole, the projections that are made in the textile fabric will be in the shape of truncated cones (i.e. the base and the top of the projections will both be round), with the diameter of the flat top of the cone being the diameter of the rod that pushes the textile through the hole, and the diameter of the base of the cone being the diameter of the hole. Similarly, if a plate with square holes and a rod with a square cross section is used, the projections will have square bases and square tops, with the sides of the tops being smaller than the sides of the bases.

The second layer in this invention may be another layer of three-dimensional fiber network material or may be a layer of planar material. If a second layer of three-dimensional fiber network material is used, it may be the same as the first layer, or it may be different, for example in polymer composition, fiber diameter, diameter or height of projections, and the like. "Planar material" means a flat thin material, such as a film, sheet, or fabric. "Film" and "sheet" herein are used interchangeably according to common usage in the art, and include synthetic polymer films and sheets, metal films and sheets, and the like. Fabrics that are used as planar layers can be knitted, woven, or non-woven. Planar materials can also include flat materials, such as metal, wood, or ceramic plates (e.g. pieces of plywood). The preferred planar materials in this invention are sheets, films, non-woven materials, knit fabrics, woven fabrics, and mixtures of these material, made from synthetic polymers, such as poly(ethylene terephthalate). Preferably the planar material will be no more than about 2 mm thick.

The layers of three-dimensional fiber network material and planar material (if used) are bonded together. They may be bonded by using an adhesive which is suitable for the materials of the planar material and the three-dimensional fiber network. They may also be bonded by applying localized heat to melt the materials together. Bonding can also be induced by ultrasonic welding, or in the case of a planar layer made of fabric or of two three-dimensional fiber network material layers, by sewing or weaving. The bonding between the three-dimensional fiber network material and the planar layer or three-dimensional fiber network material is generally between the parts of the fiber network material that are in contact with each other or with the planar material. For the three-dimensional fiber network material, this means the tops of the projections, the tops of the depressions, or the base plane.

When two pieces of three-dimensional fiber network material are bonded, they may be stacked in numerous ways. For example, the pieces of three-dimensional fiber network material may be stacked so that the projections face each other and are joined at their tops, or so that the projections interlock with one another. Alternatively, the projections may face in the same direction so that the projections of one piece of fabric meet the base plane of the next piece of fabric or fit into the back side of the projections of the next piece, with the pieces of network material being "nested" together. Two pieces of three-dimensional fiber network material may also be stacked, with the base planes facing each other and the projections facing outward. The various methods of combining the layers offer flexibility in adjusting the cushioning and impact absorbing properties of the laminated fiber networks.

The simplest laminated structure that includes a planar material in accordance with this invention consists of one piece of three-dimensional formed fiber network material and one piece of plastic film, sheet, or synthetic fabric. A more typical simple laminated structure consists of one piece of three-dimensional formed fiber network material sandwiched between two pieces of planar material. In a preferred embodiment, the piece of three-dimensional fiber network material may be interdigitated, which means that the fabric comprises both projections and depressions alternating with each other in a grid. In interdigitation, the alternating projections and depressions are made at the same time by a thermo-mechanical process in which the pins that make the projections and the pins which make the depressions alternate with one another, resulting in a material with an undulating wave-like appearance. The low points between the projections on one side of the fabric are the tops of the depressions on the other side of the fabric, and vice-versa. The interdigitated material is placed between two pieces of planar material, such as pieces of plastic film or sheet, or pieces of non-woven material (e.g. a polyester non-woven mat). The interdigitated materials may also be stacked.

Multiple layers may also be used, such as for example two fiber network layers alternating with three layers of planar material, with the planar layers generally (but not always) being the top and bottom layers of the laminated fiber network. When multiple layers are used, there need not be complete registration between the projections and depressions of fiber network layers, if the planar layers are sufficiently stiff, as is the case for a plastic film or sheet. This means that the tops of the projections or depressions of one layer do not necessarily need to match up with the tops of projections or depressions of the next fiber network layer. Preferably however, the projections and depressions of adjacent materials will have the same spacing to allow better matching of the layers (e.g. the tops of all the projections or depressions in adjacent layers will match so that they can be bonded together).

The laminated fiber network structures described herein are highly resilient. "Resilient" has the same meaning for the laminated fiber networks as it does for the three-dimensional fiber network materials used in making the laminated fiber networks, that the material returns essentially to its original shape and thickness after being compressed to 50% of its original thickness. The laminated networks make excellent impact absorbers, and also have excellent cushioning properties. The use of the planar layer on top of the three-dimensional fiber network material or the use of two pieces of three-dimensional fiber network material distributes the forces more evenly between the projections or depressions, resulting in more uniform cushioning.

The bonding of one piece of planar material to a piece of three-dimensional fiber network or the bonding of two pieces of three-dimensional fiber network material as described herein considerably stiffens the resistance of the three-dimensional fiber network material to compression. Even though the laminated structure is stiffer, it still is highly resilient, recovering its original shape and height after being compressed by 50%. Surprisingly, the stiffening effect that results from bonding a planar material to the surface of a piece of three-dimensional fiber network occurs even when the planar material is not rigid, as for example, a piece of woven or non-woven fabric. This is unexpected and increases the flexibility of designs and ranges of stiffness that are available using the three-dimensional fiber network materials.

The laminated fiber networks have many uses where comfort, cushioning, or impact-resistance is needed or desirable, including shoe linings, linings for the upper part of the shoe and midsole of an athletic or other shoe, seating, mattresses, furniture, aircraft/marine panels, architectural panels, acoustics, and vibration damping, for example.

Because of the openness of the structure, the materials are also extremely lightweight, as is also the case for the three-dimensional fiber network materials used to make the laminates. Thus, laminated materials made from polyester fabric and polyester non-woven material have an apparent density of less than about 15% of the actual density of polyester, which is about 87 lbs/cu ft.

The invention is further taught and described in the following non-limiting examples.

EXAMPLES

In these examples, samples were subjected to compression tests using a modification of methods that are used for polyurethane foams and latex foams. Samples of the laminated materials were placed between the plates of a Sintech tensile tester and then pre-loaded to a load of 0.02 psi. The distance between the plates at 0.02 psi of compression was defined as the thickness of the sample. The samples were then compressed to 60% compression for two cycles at test speeds of 0.2 in/min for samples 0.10–0.29 inches in thickness, 0.5 in/min for samples 0.30–0.69 inches in thickness, and 1.0 in/min for samples 0.70–1.39 inches in thickness. Six minutes after the pre-cyling above, a compression test was run to 60% compression at the same speed as in the pre-cycling. Stress and percent compression were measured, and the stress at 25% and 50% compression was measured. The thickness of the samples at 0.02 psi stress was measured after the stress was released at the end of the test. The ratio of thickness after the compression test compared with the thickness before the compression test was calculated as the % recovery after compression. These measurements show an increase in stress with increasing compression, which is a characteristic that is desirable for cushioning applications, and a high resilience (at least 90% of recovery of height after compression).

The apparent volume was computed based on the thickness as measured at 0.02 psi, as described above, and the measured dimensions (length and width) of the sample. This was used to compute the apparent density of the laminated samples, and these densities ranged from 1.33 to 10.22 lbs/cu ft. By comparison solid PET has a density of about 87 lbs/cu ft. Thus the apparent density of the laminated fiber network is less than about 15% of the density of solid PET (1.5% –11.7% in these examples). The apparent densities of the laminated and non-laminated samples of Examples 1–4 are also shown in Table 1.

The three-dimensional fiber network materials are made by the following general methods. Samples having projections without depressions are generally made from knit fabrics, although woven fabrics can also be used, by using a heated press plate, which is a metallic plate having holes spaced in the pattern of the desired projections. The diameters of the holes correspond to the desired diameters of the projections at their base. The press plate is heated to about 200° C., and the fabric is held against the press plate for a few minutes (e.g. two to six minutes). Push pins which have been heated to about 180° C. are then pushed through the holes from the fabric side (so that the fabric is pushed through the hole) to yield the projections. The diameters of the push pins are the same as the diameters of the flat tops of the projections. The height of the projections is approximately the distance the pins are pushed through the holes.

The samples that are referred to as interdigitated are generally made from woven fabrics, though a knit fabric was used in Example 2; interdigitated materials made from knit fabrics have a very soft feel compared with those made from woven fabrics. Woven fabrics are more often interdigitated because they are more difficult to make into a fiber network having only projections by the method described above. Woven fabrics have less flexibility than knit fabrics in terms of movement of the filaments, and breakage of the fibers is easier in a woven fabric. The fabrics are fabricated into an interdigitated pattern by heating them, and while the fabrics are hot, pressing heated push pins at about 220° C. into both sides of the fabric at the same time to about the same depth. The pins on one side of the fabric alternate with pins on the other side, yielding an interdigitated pattern in which the projections and depressions are close enough to one another that there is little or no visible base plane remaining between the individual projections and depressions. The material has an undulating appearance, and the projections and depressions are curved on top and are more like domes. The two sides of the material are the same, so that if a sample of material is turned over, it still has the same appearance.

Several samples of layered materials were made and tested according to the procedures described herein. The layered materials are described in the examples below, and their properties are summarized in Table 1.

Example 1

An 11 gauge, plain Jersey fabric was knit from a 150 micron polyester monofilament yarn. A three-dimensional network structure was formed from the fabric by placing the fabric on a heated aluminum plate in which a square array of ⅜ inch diameter holes had been drilled. A matching array of ¼ inch diameter pins is pushed through the holes to a depth of about ⅜ inch, stretching the fabric into the holes. The array spacing is ½ inches. The network formed has an array of truncated cones projecting approximately % inch above the base plain. The network is highly resilient when compressed and provides a pleasant level of cushioning. Its properties under compression are shown in Table 1 as Example 1A. Thicker, layered structures are formed by inverting a second network fabric having the same dimensions, aligning the flat tops of the truncated cones, and ultrasonically welding the flat tops together. In Example 1B of Table 1, the flat tops of the truncated cones are in direct contact. In Example 1C, a thin knit Jersey fabric is positioned between the flat tops and ultrasonically welded between the flat tops. Surprisingly, the layered sample has a higher compression modulus than the original material. There is no loss in resilience. Even more surprising is that the addition of a thin flat textile fabric increases the compression modulus even more while still preserving the resilience.

Example 2

An 8 gauge, plain Jersey fabric was knit from a 300 micron polyester monofilament yarn. An interdigitated three-dimensional network of alternating projections and depressions was created in the fabric by shaping the material at elevated temperature between two square arrays of ⅜ inch diameter pins spaced ¾ inch apart. The upper pin array is offset from the lower array, allowing the pins to interpenetrate to a depth of about 10 mm, resulting in a three-dimensional fiber network having both projections and depressions, which are the same (i.e. the fabric looks the same when turned over). The projections and depressions are dome shaped. The three-dimensional fabric provides a pleasant level of cushioning and is highly resilient when compressed. As in Example 1, layered structures were formed from the three-dimensional fabric by aligning and ultrasonically welding the tops of the domes of the upper layer to the tops of the domes of the lower layer. Similarly, a layered structure was made with a thin knit Jersey fabric layer between the two three-dimensional fabric materials, where the fabric and tops of the domes were ultrasonically welded together. The compression data are shown in Table 1 for the fabric (Example 2A), the two three-dimensional fabrics with the domes welded together (Example 2B), and the two three-dimensional fabrics with the domes welded together with a textile fabric between them (Example 2C). As in Example 1, the two layered structures are significantly stiffer under compression than the single layer material. There is no loss in resilience.

Example 3

An 18 yarn/inch by 18 yarn/inch plain woven fabric is woven from 500 micron (0.5 mm ) polyester monofilament. The interdigitated structure of Example 2 is pressed into the fabric, yielding an interdigitated material with 10.2 mm high domes. Due to the large fiber diameter this fabric has a significantly greater compression modulus than the materials in Examples 1 and 2. The compression data are shown in Table 1 as Example 3A. Layered structures are formed as in the preceding examples. Example 3B is a structure with the tops of the domes of the interdigitated structures ultrasonically welded together, as in Examples 1 B and 2B. Example 3C has a layer of knit Jersey fabric ultrasonically welded between the curved tops of the domes. Example 3D uses a thicker non-woven polyester layer (TREVIRA® C-150 spunbond fabric) between the two interdigitated structures, with the tops of the domes and the fabric bound together using Morton ADCOTE™ 545 adhesive. Example 3E uses a 0.25 mil film made from a blend of 20% RITEFLEX® thermoplastic copolyetherester elastomer and 80% PET as a layer between two pieces of three-dimensional fiber network material. The layers are joined at the contact points using ADCOTE 545 adhesive. The compression data for these are shown in Table 1. In all cases, the layered structures had higher compression moduli than the single layer. Furthermore, the stiffer the central material, the higher the compression modulus of the layered structure.

Example 4

The 500 micron 18×18 fabric used in Example 3 was formed at an elevated temperature into an 11.9 millimeter thick interdigitated network using an array of ½ inch diameter pins. The test data for this material is shown as Example 4A. A structure having one planar layer and one layer of three-dimensional fiber network material was made by bonding the tops of the domes of the interdigitated fabric to a piece of TREVIRAD C159 spunbond non-woven fabric at the contact points using ADCOTE 545 adhesive. This is shown as Example 4B in Table 1. It is stiffer under compression than the interdigitated material alone. A second layer of planar material was also bonded to the other side of the interdigitated material using ADCOTE 545 adhesive, resulting in a three-dimensional fabric material sandwiched between two planar layers. This is shown in Table 1, as Example 4C. This is the stiffest of the three samples in Example 4.

It is to be understood that the above embodiments of the invention are illustrative only, and that modification throughout may occur to one skilled in the art. Accordingly, this invention is not to be regarded as limited to the embodiments disclosed herein.

TABLE 1

Properties of Layered Structures

| Example | % Height Recovery | Load at 25% Compression (psi) | Load at 50% Compression (psi) | Apparent Density (lbs/cu ft) |
|---|---|---|---|---|
| 1A (Control) | 97 | 0.15 | 0.28 | 1.06 |
| 1B | 99 | 0.16 | 0.4 | 1.33 |
| 1C | 95 | 0.22 | 0.5 | 1.50 |
| 2A (Control) | 100 | 0.46 | 0.73 | 2.10 |
| 2B | 100 | 0.59 | 0.87 | 2.36 |
| 2C | 100 | 0.92 | 1.22 | 2.99 |
| 3A (Control) | 95 | 2.35 | 3.59 | 2.81 |
| 3B | 98 | 2.65 | 4.2 | 3.65 |
| 3C | 98 | 3.65 | 6.42 | 3.91 |
| 3D | 96 | 3.82 | 8.97 | 5.44 |
| 3E | 99 | 5.21 | 9.33 | 8.03 |
| 4A | 97 | 2.78 | 4.2 | 2.51 |
| 4B | 94 | 4.62 | 10.88 | 6.62 |
| 4C | 93 | 6.6 | 12.24 | 10.22 |

We claim:

1. A laminated fiber network, comprising:
   (a) a first layer, comprised of a three-dimensional fiber network material;
      wherein said three-dimensional fiber network material is a woven or knit textile fabric having a multiplicity of compressible projections rising above the base plane of said textile fabric, and optionally a multiplicity of compressible depressions extending below the base plane of said textile fabric, said textile fabric comprising thermoplastic filaments having a diameter in the range of about 0.1 mm to about 1.0 mm, said filaments in said fabric crossing over one another at intersections, said filaments at substantially all of said intersections not being bonded to one another in those areas in which said three-dimensional fiber network material is not bonded to other materials;
      wherein said three-dimensional fiber network material has two surfaces, said first surface being defined by the tops of said projections, said second surface being said base plane of said fabric or optionally the surface defined by the tops optional depressions; and
   (b) a second layer, comprised of a material selected from the group consisting of a planar material and a three-dimensional fiber network material, which may be the same or different from the three-dimensional fiber network material in said first layer, said second layer having two surfaces;
      wherein one surface of said first layer is bonded to one surface of said second layer at the points at which said surfaces are in contact with each other thereby providing a structure having an increased compression modulus which is also resilient returning substantially to its original height and shape after being compressed to 50% of its height.

2. A laminated fiber network as recited in claim 1, wherein said second layer is comprised of a three-dimensional fiber network material;
   wherein said first layer and said second layer are bonded together at surfaces independently selected for each layer from the group consisting of said surface defined by said tops of said projections and said surface defined by said base plane or said tops of said optional depressions.

3. A laminated fiber network as recited in claim 2, wherein said first layer and said second layer each comprises projections and depressions and are bonded to each other at surfaces independently selected for each layer from surfaces defined by said tops of said projections and said tops of said depressions.

4. A laminated fiber network as recited in claim 3, wherein said first layer and said second layer each comprise projections and depressions, wherein said projections and depressions are interdigitated.

5. A laminated fiber network as recited in claim 1, wherein said second layer is a planar material.

6. The laminated fiber network as recited in claim 1, further comprising one or more additional layers, wherein each additional layer is comprised of a material independently selected from the group consisting of a planar material and a three-dimensional fiber network material, wherein the material in each layer may be the same or different than the material in other layers;
   wherein the surfaces of each layer are bonded to the surfaces of adjacent layers at the points at which said surfaces are in contact with one another.

7. A laminated fiber network as recited in claim 1, wherein said first layer which is comprised of a three-dimensional fiber network material is sandwiched between two layers comprised of a planar material.

8. A laminated fiber network as recited in claim 1, wherein one layer of planar material is sandwiched between two layers comprised of said three-dimensional fiber network material.

9. The laminated fiber network as recited in claim 1, wherein said surfaces are bonded to each other at the points at which said surfaces are in contact with each other by a method of bonding selected from the group consisting of adhesive bonding, melt bonding, ultrasonic welding, sewing, and weaving.

10. The laminated fiber network as recited in claim 1, wherein said thermoplastic filaments are monofils.

11. The laminated fiber network as recited in claim 1, wherein said thermoplastic filaments comprise a thermoplastic polymer selected from the group consisting of polyesters, polyamides, thermoplastic copolyetherester elastomers, poly(arylene sulfides), polyolefins, aliphatic-aromatic polyamides, polyacrylates, and thermotropic liquid crystalline polymers.

12. The laminated fiber network as recited in claim 1, wherein said thermoplastic filaments comprise a thermoplastic polymer selected from the group consisting of poly (ethylene terephthalate), polyethylene, polypropylene, nylon 6, and nylon 66.

13. The laminated fiber network as recited in claim 1, wherein said thermoplastic filaments are monofils consisting essentially of poly(ethylene terephthalate).

14. The laminated fiber network as recited in claim 13, wherein said are monofils have a diameter in the range of about 0.1 mm to about 0.6 mm.

15. The laminated fiber network as recited in claim 1, wherein said projections of said three-dimensional fiber network material have a height in the range of about 2 mm to about 25 mm.

16. The laminated fiber network as recited in claim 1, wherein said projections of said three-dimensional fiber network material have a diameter in the range of about 3 mm to about 25 mm.

17. The laminated fiber network as recited in claim 1, wherein said planar material is selected from the group consisting of polymeric sheet or film, metal sheet or film, woven fabrics, knitted fabrics, non-woven materials, metal plates, wooden plates and ceramic plates.

18. The laminated fiber network as recited in claim 1, wherein said planar material is comprised of poly(ethylene terephthalate) in the form of a material selected from the group consisting of sheet, film, non-woven material, knit fabric, woven fabric, and mixtures thereof.

19. The laminated fiber network as recited in claim 1, wherein said textile fabric includes a bacteriacide.

20. A method of making a material having cushioning or impact resistance comprising the steps of:

(a) making a monofilament having a diameter in the range of about 0.1 mm to about 1 mm from a thermoplastic polymer;

(b) making said monofilament into a knit, woven, or non-woven textile fabric, said filaments in said fabric crossing over one another at intersections, said filaments at substantially all of said intersections not being bonded to one another;

(c) making a series of projections and optional depressions in said textile fabric by a thermo-mechanical process to yield a three-dimensional fiber network material; and (d) bonding a layer of planar material to one or both surfaces of said three-dimensional fiber network material at the points at which said surfaces are in contact with each other, thereby providing a structure having an increased compression modulus which is also resilient. returning substantially to its original height and shape after being compressed to 50% of its height.

21. The method as recited in claim 20, wherein said monofilament is made by a melt-spinning process.

22. The method as recited in claim 20, wherein said thermo-mechanical process is carried out by application of a mechanical force at a temperature above the glass transition temperature and below the melting temperature of said thermoplastic polymer.

23. The method as recited in claim 20, wherein said thermoplastic polymer is poly(ethylene terephthalate).

24. The method as recited in claim 20, wherein said textile fabric is a knit fabric.

25. The method as recited in claim 20, wherein said textile fabric is a woven fabric.

* * * * *

UNITED STATES PATENT AND TRADEMARK OFFICE
CERTIFICATE OF CORRECTION

PATENT NO. : 5,972,477
DATED : October 26, 1999
INVENTOR(S) : Kim et al.

It is certified that error appears in the above-identified patent and that said Letters Patent is hereby corrected as shown below:

Column 14, line 12, after "tops" insert --of said--.

Signed and Sealed this

Sixteenth Day of May, 2000

Attest:

Q. TODD DICKINSON

Attesting Officer          Director of Patents and Trademarks